(12) United States Patent  (10) Patent No.: US 9,118,243 B2
Mohr et al.  (45) Date of Patent: Aug. 25, 2015

(54) POWER CONVERTER DEPENDENT ON A VOLTAGE RANGE THE INPUT VOLTAGE RESIDES IN

(75) Inventors: David Paul Mohr, Spring, TX (US); Daniel Humphrey, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 466 days.

(21) Appl. No.: 13/513,438

(22) PCT Filed: Oct. 25, 2010

(86) PCT No.: PCT/US2010/053943
§ 371 (c)(1),
(2), (4) Date: Jun. 1, 2012

(87) PCT Pub. No.: WO2012/057730
PCT Pub. Date: May 3, 2012

(65) Prior Publication Data
US 2012/0249110 A1    Oct. 4, 2012

(51) Int. Cl.
*H02M 3/156* (2006.01)
*H02M 1/00* (2007.01)

(52) U.S. Cl.
CPC ...... *H02M 3/156* (2013.01); *H02M 2001/0022* (2013.01)

(58) Field of Classification Search
USPC ......................................................... 323/299
See application file for complete search history.

(56) References Cited

U.S. PATENT DOCUMENTS

| | | | |
|---|---|---|---|
| 4,435,747 A * | 3/1984 | Furuichi et al. | 363/25 |
| 5,325,282 A | 6/1994 | Bansard | |
| 5,570,276 A | 10/1996 | Cuk et al. | |
| 5,982,151 A * | 11/1999 | Nagai et al. | 320/141 |
| 6,049,471 A | 4/2000 | Korcharz et al. | |
| 6,281,668 B1 * | 8/2001 | Sudo | 323/299 |
| 6,944,034 B1 | 9/2005 | Shteynberg | |
| 7,804,283 B2 * | 9/2010 | Krellner et al. | 323/259 |
| 7,884,586 B2 * | 2/2011 | Fabbro | 323/259 |
| 8,148,968 B2 * | 4/2012 | Baurle et al. | 323/299 |
| 2004/0184294 A1 | 9/2004 | Stojcic et al. | |
| 2009/0175058 A1 | 7/2009 | Baurle et al. | |
| 2009/0278520 A1 | 11/2009 | Perreault et al. | |
| 2012/0249110 A1 * | 10/2012 | Mohr et al. | 323/299 |
| 2013/0128637 A1 * | 5/2013 | Humphrey et al. | 363/84 |

FOREIGN PATENT DOCUMENTS

| | | |
|---|---|---|
| CN | 1236501 | 11/1999 |
| CN | 101159415 | 4/2008 |
| CN | 101785172 | 7/2010 |
| JP | 2000060115 A | 2/2000 |

OTHER PUBLICATIONS

IPO, Office Action mailed Mar. 25, 2015, GB1217569.1, 3 pps.

* cited by examiner

*Primary Examiner* — Jeffrey Sterrett
(74) *Attorney, Agent, or Firm* — Tarolli, Sundheim, Covell & Tummino LLP

(57) ABSTRACT

A power converter (14) can include a switching system (18) to convert a direct current (DC) input voltage to an output voltage based on a switching signal having a duty-cycle. A controller (16) can set the duty-cycle of the switching signal, depending on the DC input voltage, to one of a substantially constant value, such that the output voltage follows the DC input voltage in a normal mode, and a value that varies inversely with respect to the DC input voltage, such that the output voltage is substantially constant in another mode.

14 Claims, 3 Drawing Sheets

POWER CONVERTER DEPENDENT ON A VOLTAGE RANGE THE INPUT VOLTAGE RESIDES IN

BACKGROUND

Direct current to direct current (DC/DC) power supplies are implemented in a variety of electronic devices to convert an input DC voltage to an output DC voltage. There are various types of DC/DC power supplies, such as buck, boost, or buck/boost switching converters. Typical DC/DC power supplies implement a feedback loop to regulate the DC output voltage to a specific magnitude based on monitoring the DC output voltage.

DETAILED DESCRIPTION

Figure 1:
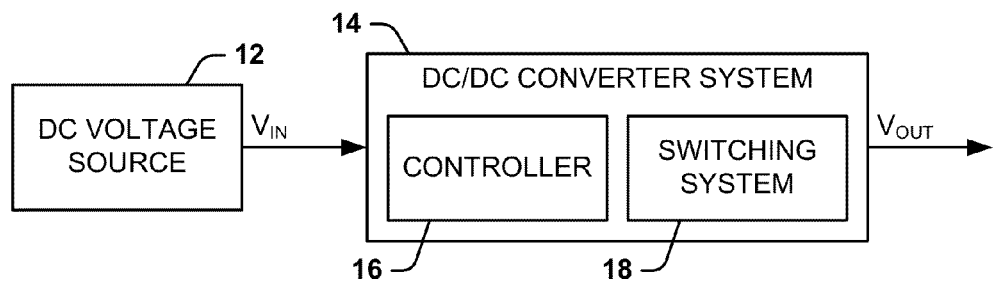
FIG. 1 illustrates an example of a power system.

FIG. 1 illustrates an example of a power system 10. The power system 10 can be implemented in a variety of electronic devices, such as a computer system or portable electronic device. The power system 10 includes a direct current (DC) voltage source 12 that is configured to provide a DC voltage, demonstrated in the example of FIG. 1 as a voltage $V_{IN}$. As an example, the DC voltage source 12 can be configured as a battery, a power bus, or a power converter. For instance, the DC voltage source 12 can be implemented as an alternating current to direct current (AC/DC) power converter. The voltage $V_{IN}$ can thus have any of a variety of magnitudes. The voltage $V_{IN}$ can vary in magnitude, such as depending on the number of circuits and devices that may be connected to the voltage $V_{IN}$.

The power system 10 also includes a direct current to direct current (DC/DC) power converter system 14. The DC/DC power converter system 14 is configured to generate a DC output voltage $V_{OUT}$ in response to the DC voltage $V_{IN}$. For example, the DC/DC power converter 14 includes controller 16 that generates a switching signal (not shown) that controls a switching system 18 to generate the DC output voltage $V_{OUT}$ from the DC voltage $V_{IN}$. As an example, the DC/DC power converter 14 can be configured as a buck converter, a boost converter, or a buck/boost converter. The controller 16 can be a pulse width modulation (PWM) controller configured to control the duty cycle of the switching signal. The controller 16 can thus set a duty-cycle of the switching signal to control the switching system 18 to generate the output voltage $V_{OUT}$. For instance, the switching system 18 can include a switch or an arrangement of switches for providing an input current to a primary side of a transformer.

As mentioned above, the magnitude of the DC voltage $V_{IN}$ can vary. For instance, the DC voltage $V_{IN}$ can experience transient conditions, such as corresponding to a condition in which the DC voltage $V_{IN}$ is outside of a normal operating range of voltages. In normal operating mode, in which DC voltage $V_{IN}$ resides in a predetermined voltage range, the DC/DC power converter system 14 can generate the DC output voltage $V_{OUT}$ to have a magnitude that is proportional to (e.g., follows) the DC voltage $V_{IN}$. However, it may be necessary and/or desirable to limit the magnitude of the DC output voltage $V_{OUT}$ to maximum and/or minimum magnitudes. Therefore, the controller 16 can be configured to set the duty-cycle of the switching signal to control the switching system 18 based on the discrete range of magnitudes the DC voltage $V_{IN}$ resides. The controller 16 can provide conditional input compensation depending on the DC input voltage, such that the output voltage can vary in a normal mode (e.g., when $V_{IN}$ is in a normal voltage range) and be substantially fixed in a transient mode (e.g., when $V_{IN}$ is outside a normal voltage range).

As an example, the controller 16 can maintain a substantially constant duty-cycle of the switching signal in a first range of magnitudes of the DC voltage $V_{IN}$, such that the DC output voltage $V_{OUT}$ has a magnitude that is substantially proportional to the DC voltage $V_{IN}$. Thus, the switching system operates efficiently within the first range. As another example, the controller 16 can set the duty-cycle of the switching signal to vary inversely (e.g., be inversely proportional) with respect to the DC voltage $V_{IN}$ in a second range of magnitudes of the DC voltage $V_{IN}$ that is greater than the first range of magnitudes. Thus, the DC output voltage $V_{OUT}$ can maintain a substantially constant maximum magnitude through the second range of magnitudes of the DC voltage. As yet another example, the controller 16 can set the duty-cycle of the switching signal to vary inversely (e.g., be inversely proportional) with respect to the DC voltage $V_{IN}$ in a third range of magnitudes of the DC voltage $V_{IN}$ that is less than the first range of magnitudes. Thus, the DC output voltage $V_{OUT}$ can maintain a substantially constant minimum magnitude through the second range of magnitudes of the DC voltage.

Figure 2:
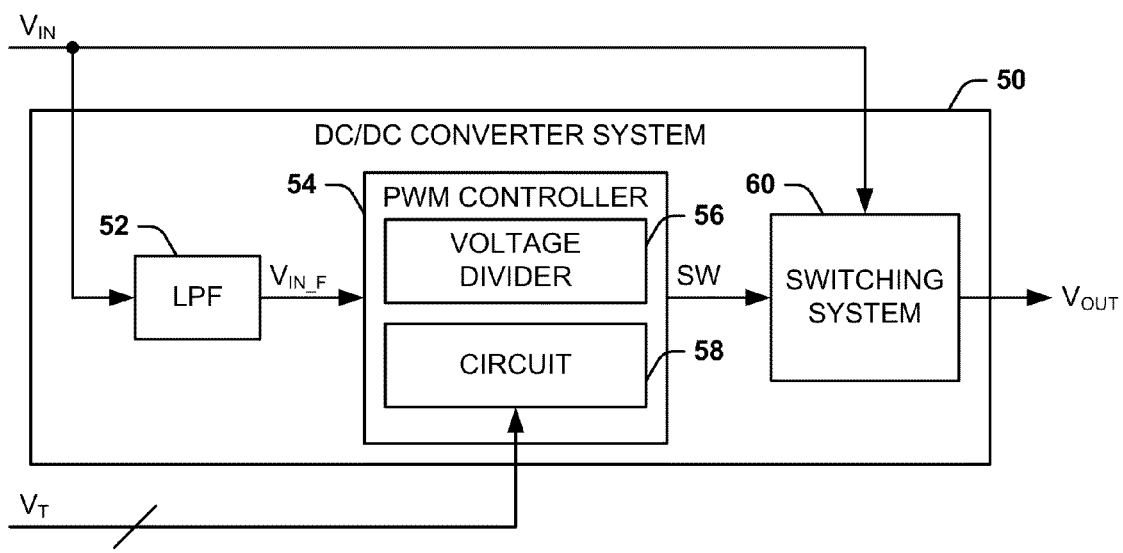
FIG. 2 illustrates an example of a DC to DC power converter system.

FIG. 2 illustrates an example of a DC/DC power converter system 50. The DC/DC power converter system 50 can correspond to the DC/DC power converter system 14 in the example of FIG. 1. Therefore, reference can be made to the example of FIG. 1 in the following description of the example of FIG. 2 for additional context.

The DC/DC power converter system 50 receives the DC voltage $V_{IN}$, such as from the DC voltage source 12 in the example of FIG. 1. The DC voltage $V_{IN}$ is provided to a low-pass filter (LPF) 52 that filters the DC voltage $V_{IN}$. As a result, rapid changes to the magnitude of the DC voltage $V_{IN}$ do not result in spurious changes to the magnitude of the DC output voltage $V_{OUT}$. That is, the DC/DC power converter system 50 is not required to compensate for spikes or other high frequency changes in the DC voltage $V_{IN}$. The LPF 52 generates a filtered version of the DC voltage $V_{IN}$, demonstrated in the example of FIG. 2 as $V_{IN\_F}$, which is provided to a PWM controller 54. The PWM controller 54 includes a voltage divider 56 that is configured to reduce the magnitude of the voltage $V_{IN\_F}$ for comparison of the voltage $V_{IN\_F}$ with one or more threshold voltages $V_T$. For example, the PWM controller 54 includes a circuit 58 that is configured (e.g., as a comparator) to compare the voltage $V_{IN\_F}$ with a threshold voltage $V_T$. As another example, the circuit 58 can compare the voltage $V_{IN\_F}$ with a first threshold voltage and a second threshold voltage, which define a first voltage range between the threshold, a second range above the second threshold and a third range below the first threshold. As described herein, the circuit 58 can be configured as any of a variety or combination of circuit components or software routines that compare the voltage $V_{IN\_F}$ with the threshold voltage(s) $V_T$. In the example of FIG. 2, the threshold voltage(s) $V_T$ are provided from an external source. As an example, the threshold voltage(s) $V_T$ can be programmable, such that they can be set by an end-user of the associated power system, such as dynamically or based on a set of switches or a dynamic resistor. However, it is to be understood that the threshold voltage(s) $V_T$ can be coded or stored within the PWM controller 54, itself.

The comparison of the voltage $V_{IN\_F}$ with the threshold voltage(s) $V_T$ can thus determine in which one of a plurality of discrete voltage ranges the DC voltage $V_{IN}$ resides. The PWM controller 54 can thus set a duty-cycle of a switching signal SW based on which of the ranges of magnitudes in which the DC voltage $V_{IN}$ resides. The ranges of magnitudes of the DC voltage $V_{IN}$ are defined by the one or more threshold voltages $V_T$. As an example, the circuit 58 can be configured to compare the voltage $V_{IN\_F}$ with two separate threshold voltages $V_T$ to determine in which of three discrete ranges of magnitudes the DC voltage $V_{IN}$ resides. Based on which range the DC voltage $V_{IN}$ resides, the PWM controller 54 can set the duty-cycle of the switching signal SW.

The switching signal SW is provided to a switching system 60. The switching system 60 can include one or more switches that are controlled based on the switching signal SW, such as to periodically couple the DC voltage $V_{IN}$ to an inductor to generate the DC output voltage $V_{OUT}$. Thus, the magnitude of the DC output voltage $V_{OUT}$ can depend on the magnitude of the DC voltage $V_{IN}$ and the duty-cycle of the switching signal SW. As mentioned above, duty-cycle of the switching signal SW can depend on which range of magnitudes in which the DC voltage $V_{IN}$ resides.

Figure 3:
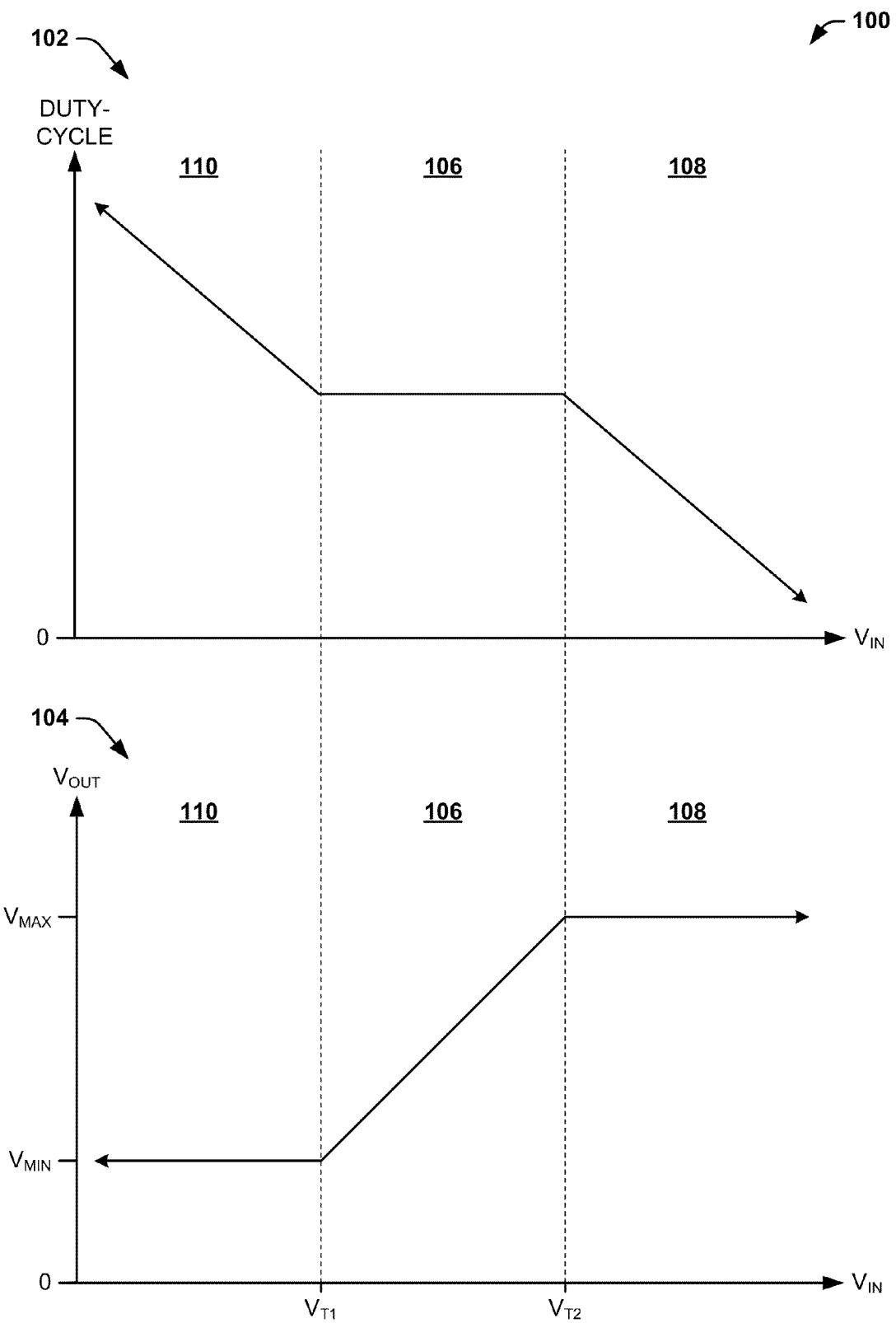
FIG. 3 illustrates an example of a diagram of graphs of output voltage and duty-cycle relative to input voltage.

FIG. 3 illustrates an example of a diagram 100 of graphs of output voltage and duty-cycle relative to input voltage. The diagram 100 can correspond to operation of the power system 10 and the DC/DC power converter system 50 in the examples of FIGS. 1 and 2, respectively. The diagram 100 includes a first graph 102 of the duty-cycle of the switching signal SW relative to the DC voltage $V_{IN}$ and a second graph 104 of the DC output voltage $V_{OUT}$ relative to the DC voltage $V_{IN}$.

The first graph 102 and the second graph 104 include two voltage magnitudes along the range of values of the DC voltage $V_{IN}$, demonstrated in the example of FIG. 3 as voltages $V_{T1}$ and $V_{T2}$. The voltages $V_{T1}$ and $V_{T2}$ can thus correspond to threshold voltages, such as included in the threshold voltage(s) $V_T$ in the example of FIG. 2, that are provided to the PWM controller 54. As an example, the threshold voltage(s) $V_T$ can be scaled in magnitude to be compared with the voltage divided magnitude of the voltage $V_{IN\_F}$ (e.g., via the voltage divider 56), such that the voltages $V_{T1}$ and $V_{T2}$ can represent versions of the threshold voltage(s) $V_T$ having magnitudes of the same magnitude scale as the voltage $V_{IN\_F}$. For instance, threshold voltages can be normalized relative to the output voltage and the voltage divider can convert the voltage $V_{IN\_F}$ to the same scale.

As a further example, the voltages $V_{T1}$ and $V_{T2}$ can define three distinct ranges of magnitudes of the DC voltage $V_{IN}$. In the example of FIG. 3, a first range of magnitudes 106 is defined as the range of magnitudes of the DC voltage $V_{IN}$ that is between the voltages $V_{T1}$ and $V_{T2}$. For instance, the range 106 can represent a normal operating range for the converter in which the converter provides the output voltage to follow the input voltage, as shown and described herein. In addition, a second range of magnitudes 108 can define a range of magnitudes of the DC voltage $V_{IN}$ that is greater than the voltage $V_{T2}$ and a third range of magnitudes 110 can define the range of magnitudes of the DC voltage $V_{IN}$ that is less than the voltage $V_{T1}$.

In response to the DC voltage $V_{IN}$ residing in the first range of magnitudes 106, such as determined based on the comparison of the voltage-divided version of the voltage $V_{IN\_F}$ relative to voltage divided versions of the voltages $V_{T1}$ and $V_{T2}$ via the circuit 58, the PWM controller 54 can set the duty-cycle of the switching signal SW to have a constant value. As a result, in the first range of magnitudes 106, the DC output voltage $V_{OUT}$ can have a magnitude that is proportional to (e.g., follows) the DC voltage $V_{IN}$. In response to the DC voltage $V_{IN}$ residing in the second range of magnitudes 108 (i.e., the DC voltage $V_{IN}$ being greater than the voltage $V_{T2}$), the PWM controller 54 can set the duty-cycle of the switching signal SW to vary inversely with respect to the magnitude of the DC voltage $V_{IN}$. As a result, in the second range of magnitudes 108, the DC output voltage $V_{OUT}$ can have a magnitude that is maintained at a substantially constant maximum magnitude, demonstrated in the example of FIG. 3 as the voltage $V_{MAX}$. In response to the DC voltage $V_{IN}$ residing in the third range of magnitudes 110 (i.e., the DC voltage $V_{IN}$ being less than the voltage $V_{T1}$), the PWM controller 54 can likewise set the duty-cycle of the switching signal SW to be vary inversely with respect to the magnitude of the DC voltage $V_{IN}$. As a result, in the third range of magnitudes 110, the DC output voltage $V_{OUT}$ can have a magnitude that is maintained at a substantially constant minimum magnitude, demonstrated in the example of FIG. 3 as the voltage $V_{MIN}$.

Referring back to the example of FIG. 2, the DC/DC power converter system 50 can thus be implemented as a feed-forward system having an input control loop for generating a DC output voltage $V_{OUT}$ in response to the DC voltage $V_{IN}$. For instance, the DC/DC power converter system 50 is a feed-forward system based on generating the DC output voltage $V_{OUT}$ based on the DC voltage $V_{IN}$, as opposed to a feedback system that monitors the magnitude of the DC output voltage $V_{OUT}$ in regulating the DC output voltage $V_{OUT}$. Therefore, the DC/DC converter system 50 can be implemented as a less expensive alternative to feedback systems based on the omission of feedback circuit components. In addition, the DC/DC converter system 50 can respond to changes in the magnitude of the DC voltage $V_{IN}$ more rapidly than typical feedback systems by operating in an open-loop, feed-forward configuration.

It is to be understood that the DC/DC power converter 50 is not intended to be limited to the example of FIG. 2. As an example, the PWM controller 54 could omit the voltage divider 56, such that the circuit 58 compare the voltage $V_{IN}$ with the threshold voltage(s) $V_T$ directly. As another example, the PWM controller 54 can be configured to define more or less than three ranges of magnitudes of the DC voltage $V_{IN}$ based on the threshold voltage(s) $V_T$. For example, the PWM controller 54 can be configured to receive only a single threshold voltage $V_T$, such as to define two ranges of magnitudes of the DC voltage $V_{IN}$ based on which the duty-cycle of the switching signal SW is set. Thus, the PWM controller 54 can set the duty-cycle of the switching signal SW inversely proportional to the magnitude of the DC voltage $V_{IN}$ at magnitudes of the DC voltage $V_{IN}$ greater than the threshold voltage $V_T$ and can set the duty-cycle of the switching signal SW at a substantially constant value at magnitudes of the DC voltage $V_{IN}$ less than the threshold voltage $V_T$. As another example, the PWM controller 54 can define four or more ranges of magnitudes of the DC voltage $V_{IN}$ based on which the duty-cycle of the switching signal SW is set, such that the PWM controller can set multiple different constant values of the duty-cycle of the switching signal SW in two or more of the intermediate ranges of magnitudes. Thus, the DC/DC power converter system 50 can be configured in a variety of ways.

Figure 4:
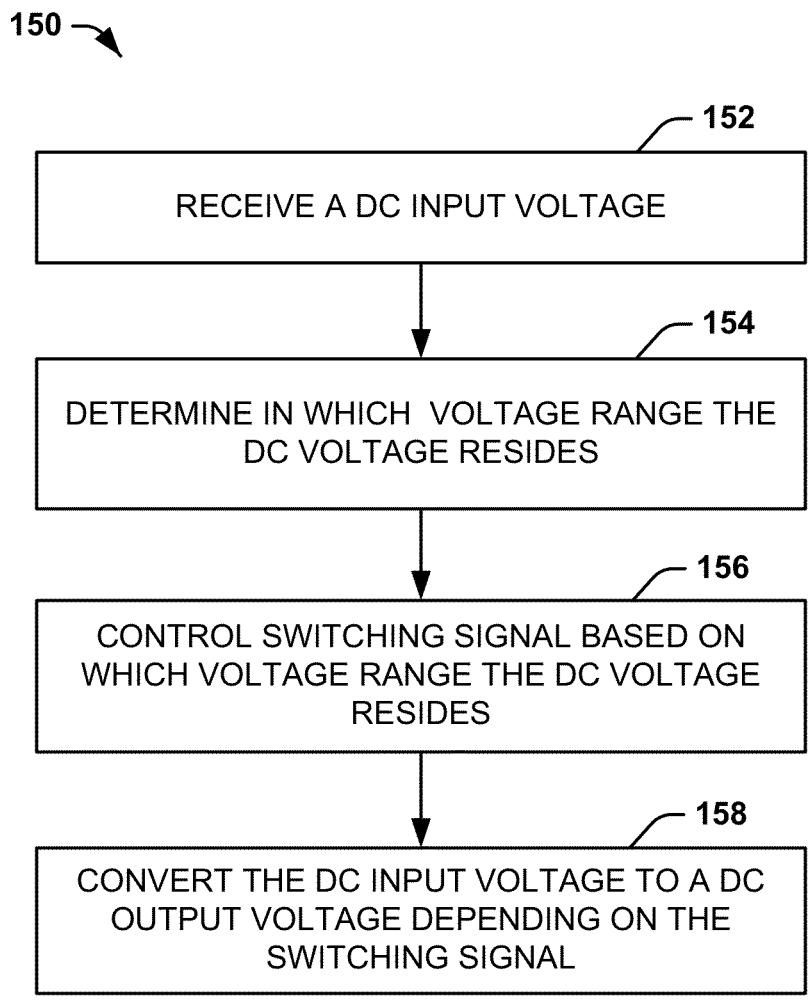
FIG. 4 illustrates an example of a method for generating an output voltage.

In view of the foregoing structural and functional features described above, an example method will be better appreciated with reference to FIG. 4. While, for purposes of simplicity of explanation, the method of FIG. 4 is shown and described as executing serially, it is to be understood and appreciated that the method is not limited by the illustrated order, as parts of the method could occur in different orders and/or concurrently from that shown and described herein.

FIG. 4 illustrates an example of a method 150 for generating an output voltage from a power system. At 152, a DC voltage is received. For example, the DC voltage can be provided from a DC voltage source (e.g., voltage source 12 of FIG. 1). At 154, it is determined in which one of a plurality of voltage ranges the DC input voltage resides. The determination at 154, for example can be made by a controller (e.g., the controller 16 of FIG. 1 or PWM controller 54 of FIG. 2) by comparing the input voltage to a threshold. At 156, a duty-cycle of a switching signal is controlled based on which one of the plurality of voltage ranges of magnitudes the DC voltage resides. The duty cycle control at 156, for example can be made by a controller (e.g., the controller 16 of FIG. 1 or PWM controller 54 of FIG. 2), such as shown and described herein. At 158, the method includes converting the DC input voltage to a corresponding DC output voltage depending on the switching signal.

What have been described above are examples. It is, of course, not possible to describe every conceivable combination of components or method, as many further combinations and permutations may be possible. Accordingly, this disclosure is intended to embrace all such alterations, modifications, and variations that fall within the scope of this application, including the appended claims. Additionally, where the disclosure or claims recite "a," "an," "a first," or "another" element, or the equivalent thereof, it should be interpreted to include one or more than one such element, neither requiring nor excluding two or more such elements.

What is claimed is:

1. A power converter comprising:
   a switching system to convert a direct current (DC) input voltage to an output voltage based on a switching signal having a duty-cycle;
   a low-pass filter that filters the DC input voltage to provide a filtered DC input voltage to a controller; and
   the controller to set the duty-cycle of the switching signal, depending on the filtered DC input voltage, to one of a substantially constant value, such that the output voltage follows the filtered DC input voltage in a normal mode, and a value that varies inversely with respect to the filtered DC input voltage, such that the output voltage is substantially constant in another mode, wherein the controller comprises a circuit to compare the filtered DC input voltage to a threshold voltage to determine in which of a plurality of discrete voltage ranges the filtered DC input voltage resides.

2. The power converter of claim 1, wherein, one of the discrete voltage ranges corresponds to the normal mode and another of the discrete voltage ranges corresponds to the another mode.

3. The power converter of claim 1, further comprising an alternating current (AC) to DC converter to convert an AC input voltage to the DC input voltage that resides in a predetermined voltage range during the normal mode.

4. The power converter of claim 1 wherein the controller sets the duty-cycle of the switching signal to the substantially constant value such that the output voltage is substantially proportional to the DC input voltage if the DC input voltage resides in a first voltage range, and the controller varies the duty-cycle of the switching signal such that the output voltage has a substantially fixed maximum voltage if the DC input voltage resides in a second voltage range, the second voltage range being greater than the first voltage range.

5. The power converter of claim 4, wherein the controller sets the duty-cycle of the switching signal such that the output voltage has a substantially fixed minimum magnitude if the DC input voltage resides in a third voltage range that is less than the first voltage range.

6. The power converter of claim 5, wherein the first voltage range resides between a first threshold voltage and a second threshold voltage, which is greater than the first threshold voltage, the second voltage range being greater than the second threshold voltage, and the third voltage range (110) being less than the first threshold voltage.

7. The power converter of claim 1 wherein each of the plurality of voltage ranges of magnitudes of the DC input voltage is defined by a respective threshold voltage.

8. A power system comprising:
   a voltage source to provide a DC input voltage; and
   a DC/DC power converter to convert the DC input voltage to a DC output voltage based on a switching signal having a duty-cycle, the DC/DC power converter comprising:
   an open-loop control loop comprising a pulse-width modulation (PWM) controller to set the duty-cycle of the switching signal depending on which of a plurality of discrete voltage ranges the DC input voltage resides, such that the DC/DC power converter provides the DC output voltage substantially proportional to the DC input voltage if the DC input voltage resides in a first range of the plurality of discrete voltage ranges, the DC/DC power converter provides the DC output voltage at a substantially fixed minimum magnitude if the DC input voltage resides in a second range of the plurality of discrete voltage ranges that is less than the first range and provides the DC output voltage at a substantially fixed maximum magnitude if the DC input voltage resides in a third range of the plurality of discrete voltage ranges that is greater than the first range.

9. The system of claim 8, wherein the PWM controller further comprises:
   a first circuit to compare the DC input voltage to a first threshold voltage between the first range and the second range of the plurality of discrete voltage ranges to provide a first comparator output; and
   a second circuit to compare the DC input voltage to a second threshold voltage between the first range and a third range of the plurality of discrete voltage ranges, the second threshold voltage being greater than the first threshold voltage, to provide a second comparator output;
   the PWM controller controlling the switching signal according to which of the first, second, and third ranges the DC input voltage resides based on the first comparator output and the second comparator output.

10. The system of claim 9, wherein each of the first and second threshold voltages are programmable.

11. A method for providing a direct current (DC) output voltage, the method comprising:
   receiving a DC input voltage from a DC voltage source;
   filtering the DC input voltage with a low-pass filter to provide a filtered DC input voltage to a controller;
   determining in which of a plurality of discrete voltage ranges the filtered DC input voltage resides;
   controlling a duty-cycle of a switching signal to have one of a substantially constant duty cycle and a variable duty cycle according to which one of the plurality of voltage ranges in which the filtered DC input voltage resides; and converting the filtered DC input voltage to a corresponding DC output voltage that is one of variable or substantially constant depending on the switching signal.

12. The method of claim 11, wherein determining in which of the plurality of ranges of magnitudes the DC voltage resides further comprises comparing the DC input voltage to a predetermined threshold voltage to determine in which one of the plurality of ranges of the DC input voltage reside.

13. The method of claim 11, wherein controlling the duty-cycle further comprises setting the duty-cycle to one of a substantially constant value and a value that varies inversely with respect to the DC input voltage based on the one of the plurality of ranges of magnitudes in which the DC input voltage resides.

14. The method of claim 11, wherein controlling the duty-cycle further comprises:
   setting the duty-cycle to a substantially constant value based on the DC input voltage residing in a predetermined normal voltage range;
   setting the duty-cycle inversely proportional to the DC input voltage based on the DC input voltage residing in a first transient voltage range such that the output voltage has a substantially constant maximum magnitude, the first transient voltage range being greater than the normal voltage range; and
   setting the duty-cycle inversely proportional to the DC input voltage based on the DC input voltage residing in a second transient voltage range such that the output voltage has a substantially constant minimum magnitude, the second transient voltage range being less than the normal voltage range.

* * * * *